United States Patent [19]

Suzuki

[11] Patent Number: 4,967,223
[45] Date of Patent: Oct. 30, 1990

[54] DISTANCE MEASURING DEVICE
[75] Inventor: Ryoichi Suzuki, Kanagawa, Japan
[73] Assignee: Canon Kabushiki Kaisha, Tokyo, Japan
[21] Appl. No.: 754,349
[22] Filed: Jul. 11, 1985

[30] Foreign Application Priority Data

Jul. 11, 1984 [JP] Japan .................... 59-143971
Oct. 11, 1984 [JP] Japan .................... 59-213122

[51] Int. Cl.⁵ .......................................... G03B 13/36
[52] U.S. Cl. .................................... 354/402; 354/403; 356/1; 356/4
[58] Field of Search ............... 354/400, 402, 403; 356/1, 4

[56] References Cited

U.S. PATENT DOCUMENTS

| | | | |
|---|---|---|---|
| 4,441,810 | 4/1984 | Momose et al. | 354/403 |
| 4,470,681 | 9/1984 | Johnson | 354/403 |
| 4,477,168 | 10/1984 | Hosoe | 354/403 |
| 4,527,892 | 7/1985 | Yamane et al. | 354/403 |
| 4,541,702 | 9/1985 | Momose et al. | 354/403 |
| 4,542,971 | 9/1985 | Numata | 354/403 |
| 4,560,266 | 12/1985 | Namai et al. | 354/402 |
| 4,571,048 | 2/1986 | Sugawara | 354/403 |
| 4,573,783 | 3/1986 | Maruyama | 354/403 |
| 4,593,987 | 6/1986 | Takahashi et al. | 354/403 |

Primary Examiner—Russell E. Adams
Attorney, Agent, or Firm—Toren, McGeady & Associates

[57] ABSTRACT

An arrangement in which a camera has its lens focused in with a distance measuring device. In the distance measuring device, a photosensor receives light reflected by an object and produces two signals whose difference represent the distance to the object. An information detector integrates the signal difference over a first time period and then inversely integrates the sum of the signals over a second time period to establish a distance on the basis of the time it takes for the integrated value to reach its initial level. An infinity detector determines whether the object is at infinity on the basis of the level of the integrated value a predetermined time after the start of, but later than the end of the first period.

56 Claims, 9 Drawing Sheets

FIG.3(a) PUC 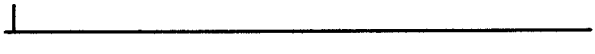
FIG.3(b) T 
FIG.3(c) T̄ 
FIG.3(d) iNT 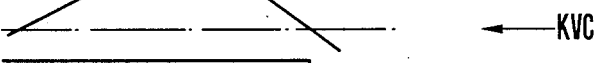 ←KVC
FIG.3(e) COMP 
FIG.3(f) JGL 
FIG.3(g) J̄ḠL̄ 
FIG.3(h) PUC 
FIG.3(i) T 
FIG.3(j) T̄ 
FIG.3(k) iNT 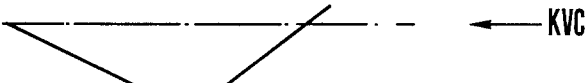 ←KVC
FIG.3(l) COMP 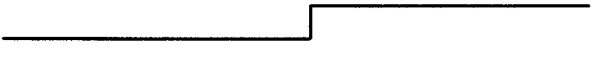
FIG.3(m) JGL 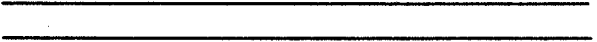
FIG.3(n) J̄ḠL̄ 

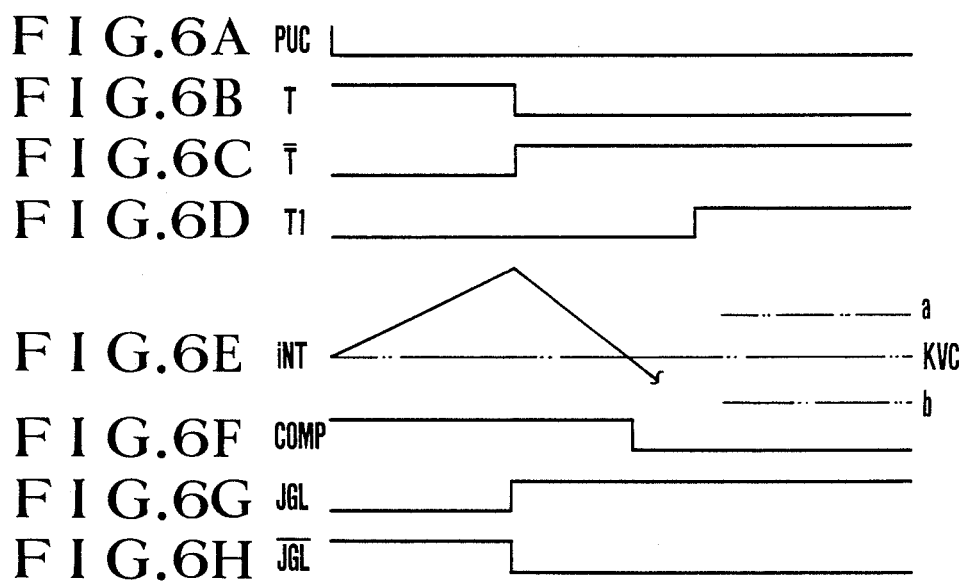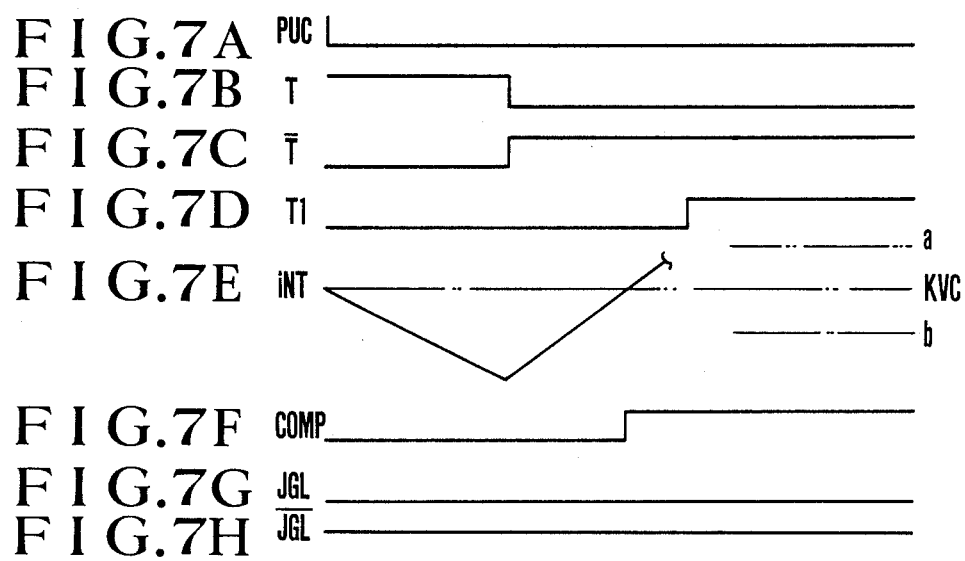

FIG. 8A PUC
FIG. 8B T
FIG. 8C T̄
FIG. 8D TI    tc
FIG. 8E iNT    a / KVC / b
FIG. 8F a-COMP
FIG. 8G b-COMP

FIG. 9A PUC
FIG. 9B T
FIG. 9C T̄
FIG. 9D TI
FIG. 9E iNT    a / KVC / b
FIG. 9F a-COMP
FIG. 9G b-COMP

DISTANCE MEASURING DEVICE

BACKGROUND OF THE INVENTION:

1. Field of the Invention

This invention relates to distance measuring devices, particularly of the kind which obtain distance information to an object by measuring light reflected from the object.

2. Description of Related Art

Known active type distance measuring devices include a light projecting element and a light receiving photo-sensitive element spaced a predetermined distance from each other along a base line. They are operated by turning either the light projecting element or light receiving element until the output of the light receiving photo-sensitive element reaches a peak value. Focusing a camera's photo-taking lens with such a device involves interclocking movement of the relevant element with the movement of the lens, and stopping the movement of the lens when the output of the light receiving photo-sensitive element reaches the peak value. Devices of this kind require a mechanical arrangement to turn either the light projecting element or the light receiving element. Furthermore, the distance measurements are ordinarily performed concurrently with the focusing movement of the photo-taking lens, and the latter accompanies the camera's shutter release operation. Hence, cameras using such devices cannot offer distance information before a shutter release operation. In order to measure a distance to an object within a view finder field prior to a shutter release operation, the camera must be supplemented with some additional equipment. A known automatic focus control system which is capable of such prefocusing is the double-image coincidence type. However, such a system not only uses an expensive charge coupled element but also requires a complex processing and computing circuit which is unsuited for a compact camera.

Japanese Patent Application Laid-Open No. SHO 57-44809 discloses a method which attempts to solve this problem. Here, a light projecting element is used with a semi-conductor position detector and a distance signal is obtained from a difference signal (A−B) representing the difference between two outputs A and B at different points on the semi-conductor position detector. To accurately correlate the difference signal (A−B) with the distance signal, the output of the light projecting element in this Japanese document is feedback controlled with pulse modulation signals applied to the light projecting element by a sum signal (A+B) representing the sum of the two outputs A and b, so that the sum signal (A+B) can be kept constant irrespective of the object distance. This arrangement not only requires complex feedback control circuitry but also involves the possibility of trouble with regard to oscillations. Another known arrangement involves computing a quotient (A−B) / (A+B) to cancel the dependency on the reflection factor of the object by normalizing the difference signal (A−B) with the sum signal (A+B). This necessitates use of a relatively complex division circuit and is incapable of adequately meeting todays requirements that call for reduction in the scale of circuitry of compact cameras.

Normalizing the difference signal (A−B) with the sum signal (A+B) is important in an automatic focus control system using two light receiving photo-sensitive elements in order to measure distances without introducing the effect of the reflection factor of the object to be photographed. To accomplish this and yet avoid the aformentioned deficiencies, Japanese Patent Application No. SHO 58-127409 filed by the assignee of the present application proposes normalization with a double integrating system using a Miller integration circuit (Miller integrator). However, such normalization integrates noise mixed into the distance measurment. Therefore, while uneven truncation decreases, only the output of one of two light receiving photo-sensitive elements is received as a distance measurement signal. Applying this system to a distance measuring device with a semi-conductor position detector, hardly produces satisfactory results in terms of the limit and accuracy of distance measurement.

Moreover many distance measuring devices do not have any means for detecting an object at infinity. Conceivably, one can supplement a distance measuring device with an infinity determining circuit, such as the one disclosed in the aforementioned Japanese Patent Application No. SHO 58-127409 (a signal A integrating arrangement). However, such a device has been found inadequate for use with a system based on the values of A−B.

SUMMARY OF THE INVENTION

An object of the invention is to improve distance measuring devices.

Another object of the invention is to avoid the aforementioned deficiencies.

Still another object of the invention is to provide a distance measuring circuit that normalizes the difference signals without a division circuit.

Yet another object of the invention to provide a distance measuring device is capable of accurately determining the distances to an object to be photographed whether the object is at infinity or not.

To attain the above stated objects, the distance measuring device, according to this invention, determines the distance by integrating the value A−B in one direction, and integrating the value A−B in the other direction to achieve normalization.

According to a feature of the invention, infinity is determined by comparing the output level of integrating means, after a predetermined infinity determining period, with a reference using the initial value of the integrating means.

The various features of novelty characterizing the invention are pointed out in the claims. Other objects and advantages of the invention will be evident from the following detailed description of embodiments of the invention when read in light of the accompanying drawings.

BRIEF DESCRIPTION OF THE DRAWINGS:

FIGS. 3(a) to 3(n) are graphs illustrating details of the operation of the embodiment of FIG. 1.

FIGS. 6A to 6H are time charts showing the operation of various circuit elements of FIG. 5, when an object to be photographed is nearby.

FIGS. 7A to 7H are time charts showing the operation of variouss circuit elements of FIG. 5, when the object is located far away.

FIGS. 8A to 8G are time charts showing their operation performed when the object is located at an intermediate distance.

FIGS. 9A to 9G are time charts showing operation of elements when the object is located close to infinity.

Figure 1:
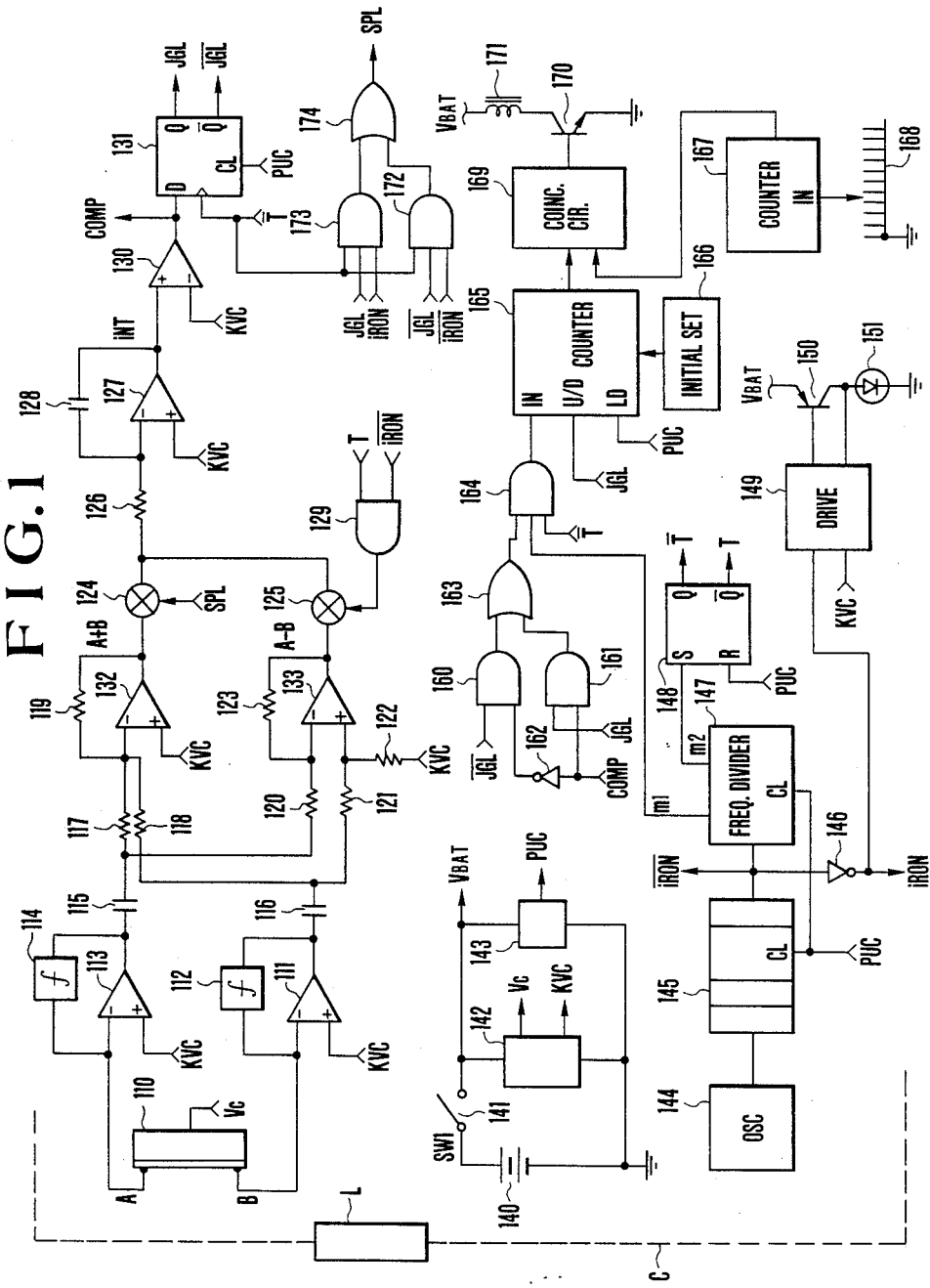
FIG. 1 is a circuit diagram showing an embodiment of the invention.

DESCRIPTION OF THE PREFERRED EMBODIMENTS:

In FIG. 1 a camera C, shown schematically, includes a focusable picture taking lens L and the remaining circuit of FIG. 1. In the camera C, a semiconductor position detector (PSD) 110 measures light reflected from an object to be photographed. An operational amplifier 111, connected to the terminal B of the detector 110, cooperates with a frequency selection circuit 112 in its negative feedback loop to form a high-pass filter. Similarly, an operational amplifier 113, connected to the terminal A of the detector 110, cooperates with a frequency selection circuit 114 to form a high-pass filter. DC blocking capacitors 115 and 116 pass the outputs of amplifiers 113 and 115 to a substraction circuit, composed of operational amplifier 133, feedback resistor 123, and input resistors 120 and 121, and to an adding circuit, composed of an operational amplifier 132, feedback resistor 119, and summing resistors 117 and 118. Hence, the output of the amplifier 132 is A+B while the output of the amplifier 133 is A−B.

An analog switch 124 passes the signal A+B from the amplifier 132 in response to a signal SPL. Analog switch 125 passes the signal A−B in response to the output of an AND gate 129. An operational integrator, or Miller integrator, composed of an input resistor 126, and an operational amplifier comparator 130, receives the input iNT at its non-inverting input and compares it with a reference voltage KVC to produce an output COMP. A D flip-flop (D−FF) 131 responds to the output COMP from the comparator 130 at its input terminal D.

A switch SW1, also identified as 141, responds to a stroke of the shutter button (not shown) of the camera reaching its first position, by closing to apply power from a battery 140 that serves as a power source. A reference voltage generating circuit 142 generates reference voltages VC and KVC. An initial reset signal generating circuit 143 generates an initial reset signal PUC.

A continuous pulse generating circuit 144 drives a frequency dividing circuit 145 which produces a continuous pulse signal $\overline{iRON}$. An inverter 146 produces a signal iRON. A second frequency dividing circuit 147 produces outputs at stages m1 and m2. A RS flip-flop 148 is reset at its terminal R by the signal PUC and is set at its terminal S by the output m2 of the frequency dividing 147. An iRED driving circuit 149 responds to the reference voltage KVC and the signal iRON to drive a transistor 150 that continously turns an infrared light emitting diode (iRED) 151 on and off so that the diode 151 emits infrared rays to be projected on an object to be photographed. The iRED 151 is driven with a constant voltage by the afornentioned driving circuit 149.

A two-input type AND gate 161 receives the output COMP of the comparator 130 and the output JGL of the D flip-flop 131. An AND gate 160 receives the output $\overline{JGL}$ of the D flip-flop 131 and the inverter 162, which applies the signal $\overline{COMP}$. A two-input OR gate 163 receives the outputs of the AND gates 160 and 161 and applies its output to one input of a three-input type AND gate 164. The AND gate 164 also receives the output of the frequency dividing stage m1 of the frequency dividing circuit 147 and the output of terminal Q, a signal $\overline{T}$ of the RS flip-flop 148. An up-down counter 165 receives the output of the AND gate 164 at its input terminal iN, the signal JGL of the D flip-flop 131 at its terminal u/D, and the signal PUC at its terminal LD. A circuit 166 generates initial setting information in the up-down counter 165. A counter 167 counts pulses generated by a comb-shaped element 168, which generates pulses that corresponds in number to the extent of movmeent of a lens barrel on a camrea which is being focused. A coincidence circuit 169 compares the output of the up-down counter 165 with that of the up-down counter 167. When the two coincide, the output of the coincidence circuit 169 goes low and turns off a switching transistor 170. The transistor 171 being off cuts off the supply of power to a control magnet 171. This stops the movement of the lens barrel of the lens L.

A three-input AND gate 172 receives the output Q (signal $\overline{T}$) of the RS flip-flop 148, the signal $\overline{JGL}$ of the D flip-flop 131 and the signal $\overline{iRON}$. A three-input AND gate 173 receives the signal $\overline{T}$, the signal JGL of the D flip-flop 131 and the signal iRON from the inverter 146. A two-input OR gate 174 receives the output of the AND gates 172 and 173 and supplies its output to the gate of the analog switch 124. The signal T of the RS flip-flop 148 and the signal $\overline{iRON}$ are supplied to the AND gate 129.

In operation, the switch SW 1 (or 141) is closed at the first position in the stroke of the shutter button of the camera C, and the refeence voltage generating circuit 142 generates the reference voltages VC and KVC. The circuit 143 generates the initial reset signal PUC. The frequency dividing circuits 145 and 147 are then reset. The RS flip-flop 148 is also reset and its output signal T at its terminal Q goes high. The signal PUC further resets the D flip-flop 131 so that the signals JGL and $\overline{JGL}$ go respectively low and high. The signal PUC sets the up-down counter 165 to a value generated by the initial setting information generating circuit 166. Disappearance of the signal PUC results in generation of the signals $\overline{iRON}$ and iRON which are composed of continuous pulses. The iRED driving circuit 149 then causes the driving transistor 150 to turn on and off in synchronism with the signal iRON. This causes the iRED 151 to flicker on and off. The light projected by the iRED 151 is reflected by the object. The reflected light passes through a receiving lens and strikes the PSD 110. The interrelationship between the current values of the outputs A and B of PSD 110 varies with the position at which the reflected light strikes the PSD 110.

For convenience, the currents of the outputs A and B of the PSD 110 are also designated A and B. Amplifiers 113 and 111 convert the output current A and B into voltages on a frequency selective basis. The blocking capacitors 115 and 116 transmit only AC signals obtained from the outputs A and B for subsequent processing. Operational amplifier 132 and its associated resistors 117, 118 and 119 add the AC signals from capacitors 115 and 116. Operational amplifier 133 and its associated resistors 120, 121, 122, and 123 substract the signals from capacitors 115 and 116. As a result of these operations, the amplifiers 132 produces an AC output voltage corresponding to the sum (A+B) of the output currents, and the amplifier 133 produces an AC output voltage corresponding to the difference (A−B) between the aforementioned output currents.

Because the RS flip-flop 148 is reset, the signal T is high and the signal $\overline{T}$ is low. Therefore, the outputs of the AND gates 173 and 174 and that of the OR gate 174 are low. Accordingly, the analog switch 124 remains off. Meanwhile, because the signal T is high, the signal $\overline{iRON}$ appears at the output of AND gate 129. In synchronism therewith, the analog switch 125 turns on and off. This causes the Miller integrator cirucit 126, 127, and 128 to integrate the output A−B.

It is assumed that the light receiving optical system causes the output current A of the PSD 110 to become larger than the output current B of the PSD 110 as the object distance decreases, i.e. as the object moves closer, and for the current A to become smaller than the output current B when the object moves further away.

Two possibilities exist, A may be greater than B or A may be smaller than B.

If A is greater than B, i.e. if the object is close by, then A−B is greater than 0. The rise of the signal T and application of the signal $\overline{iRON}$ to analog gate 125, cause the integrator 127, 128 to integrate and cause the output of the operational amplifier 127 to rise from the level of the reference voltage KVC. This continues for a predetermined time following the disappearance of the signal PUC as established by the dividing circuit 147. Upon lapse of the predetermined time, the frequency dividing stage m2 of the frequency dividing circuit 147 changes to high. This sets the RS flip-flop 148 and its output $\overline{T}$ goes high and its output T swings low. Therefore, the output level of the AND gate 129 goes low to turn off the analog switch 125. Because the level of the output iNT of the operational amplifier 127 has risen above the level of the reference voltage, the output level of comparator 130 is high. Therefore, when the signal $\overline{T}$ goes high, the D flip-flop 131 is triggered to change the level of the signal JGL to high and that of the signal $\overline{JGL}$ to low. As a result, the level of the AND gates 172 becomes low. The high $\overline{T}$ and JGL open the gate 173. Then the signal iRON is produced at the output terminal of the gate 173 and the output (herein known as SPL) of the OR gate 174. The analog switch 124 then turns on in off and synchronism with the signal iRON from the OR gate 174. Therefore, the electric charge of the capacitor 128 of the Miller integrator 127, 128 is discharged by the signal A+B from the operational amplifier 132. The level of the output iNT of the operational amplifier 127 then drops.

Because the signal $\overline{JGL}$ is low, the output of the AND gate 160 is also low, while the signal JGL and the output COMP of the compartor 130 are high. Therefore, the output of AND gate 161 and OR gate 163 are high. Therefore, when the level of the signal $\overline{T}$ swings high, the AND gate 164 produces the continuous pulses of the frequency dividing stage m1 of the frequency dividing circuit 147. Because the signal JGL is high, the pulses thus produced are counted up by the up-down counter 165.

The output iNT of the operational amplifier 127 now drops. When it becomes lower than the level KVC, the output COMP of the comparator 130 goes low. The output levels of the AND gate 161 and the OR gate 163 also go low and cause the AND gate 164 to close. This stops the counting operation of the up-down counter 165. The count information now held by the up-down counter 165 represents information concerning the measured distance.

If A is smaller than B, that is when the object is far away, A−B is less than 0. Therefore, when the high signal T causes gate 129 to pass the signal iRON to the gate 125, the output iNT of the operational amplifier 127 drops from the level of the reference voltage KVC. At the predetermined time, the frequency dividing circuit 147 sets the flip-flop 148 to reverse the integration, the signal T going low, and the signal $\overline{T}$ going high, and the output COMP of the comparator 130 is low. Therefore, the signals JGL and $\overline{JGL}$ of the D flip-flop 131 remain low and high, respectively. Accordingly, the output of the AND gate 161 is low. However, the output of the inverter 162 is high. Hence, the output of the AND gate 160 and the OR gate 163 are high. Therefore, when the level of the signal $\overline{T}$ changes to high, the AND gate 164 produces the continuous pulses of the frequency dividing stage m1 of the frequency dividing circuit 147. Because the signals JGL is low, the up-down counter 165 now counts down the pulses. The low signal JGL turns off the AND gate 173.

With the signal JGL low, when the signal $\overline{T}$ goes high, the AND gate 173 goes off and the signal $\overline{iRON}$ is produced at the output terminal of the AND gate 172 and the OR gate 174. This causes the electric charge of the Miller integrator capacitor 128 to discharge in response to the signal A+B. The output iNT of the operational amplifier 127 now rises. When the output iNT of the amplifier 127 exceeds the level of the reference voltage KVC, the output COMP of the comparator 130 goes high. The output of the inverter 162 now goes low. The outputs of the AND gate 160 and the OR gate 163 go low. The AND gate 164 now closes. This stops the count-down operation of the up-down counter 165. Here, the count information held by the up-down counter 165 at that time represents the measured distance information.

In this embodiment, a release mechanism, not shown, moves the lens barrel from a position representing infinity, toward a position representing the nearest distance when A is greater than B, or A is less than B. The counter 167 counts the pulses produced by the comb-shaped element 168 as the lens barrel moves. When the value of the counter 167 coincides with that of the counter 165, the output of the coincidence circuit 169 changes to low and turns off the transistor 170. The turned-off transistor 170 cuts off the power supply to the AF electro-magnet 171. The movement of the lens barrel is then brought to a stop by a known mechanism and the focusing operation ends. The optical system for directing light onto the PSD 110 is disclosed, for example, in Japanese patent application SHO 57-44809.

Figure 2A:
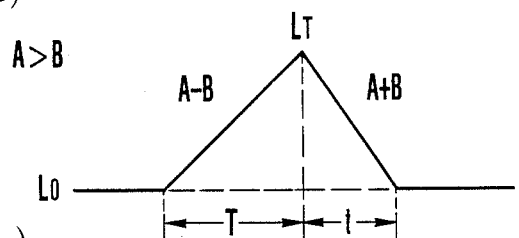
FIGS. 2(a) and 2(b) are graphs illustrating the general operations of the embodiment in FIG. 1.
Figure 2B:
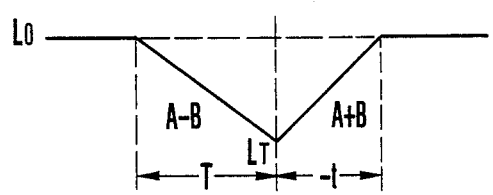

The general principle of the operation of the circuit in FIG. 1 appears in FIG. 2(a) and 2(b). The magnitudes of the signals produced at the upper terminals of the PSD are A and B and their interrelated magnitudes vary with the position at which the light reflected by the object strikes the PSD. That is, they vary according to the object distance. A difference signal A−B is integrated by the Miller integrator circuit for a predetermined period of time T. FIGS. 2(a) and 2(b) show the integrated output of the Miller intergrating circuit, with respect to time, along the abscissa. Where A is greater than B, as shown in FIG. 2(a), the integrated output of the difference signal A−B rises in the positive direction from an initial value LO to a level LT after the lapse of a period of time T. If A is less than B, it decreases in the negative direction as shown in FIG. 2(b). With the sum signal A+B integrated for a period of time t, the integration output returns to the initial level LO from the level LT after the lapse of the aforementioned predetermined period of time t. For this operation, the direction in which the sum signal A+B is to be integrated is selected according to the polarity of the integration of the output obtained after the lapse of the time T. The period of time t required for bringing the integrated level LT back to the initial level LO furnishes the distance measurement information which is depended solely on the distance to the object and is irrelevant to the intensity of the light striking the object.

More details of the operation of the circuit in FIG. 1 are shown in FIGS. 3(a) to 3(g), which refer to the operation when A is greater than B, and FIGS. 3(h) to 3(n), which refer to the operation when A is smaller than B. At the start, when A is greater than B, the signal PUC causes the frequency dividing circuit 145 to produce the signal, and iRON resets the flip-flop 148 so that the value of T goes high as shown in FIGS. 3(a) and 3(b). The signal iRON at the AND gate 129 then turns the analog gate 125 on and off. This applies the voltage A−B to the operational amplifier 127 and charges up the capacitor 128. This is shown in FIG. 3(d). The voltage iNT rising above the value KVC, causes the comparator 130 to turn the signal COMP high and to constrain the D flip-flop 131 to produce a high output $\overline{JGL}$ and a low output JGL as shown in FIGS. 3(f) to 3(g). When the frequency dividing circuit 147 produces its value at m2 after a predetermined time, it sets the flip-flop 148 to make the value T go low. This turns off the analog switch 125. At the same time, the signal $\overline{T}$ goes high and reverses the values of JGL and $\overline{JGL}$ as shown in FIGS. 3(f) and 3(g). The high signal JGL and $\overline{T}$ causes the gate 173 and gate 174 to supply the signal iRON to the gate 124. The signal A+B now discharges the capacitor 128 in the Miller integrator 127, 128. At the same time, the high JGL signal and the high COMP signal, as well as the high $\overline{T}$ signal, cause the gates 161, 163, and 164 to count the pulses from the stage m1 of the frequency dividing circuit 147. When the value iNT decreases below the value KVC as a result of the charging of the value A+B, the comparator 130 goes low and swings the signal COMP low. This turns off the gates 161, 163 and 164. Thus, the counter 165 contains a value representing the distance to the object.

When A is smaller than B, the initial signal iRON at the analog switch 125 charges the capacitor 128 and reduces the signal iNT as shown in FIGS. 12(h) to 12(k). When a predetermined time elapses, as determined by the stages m2 of the divider 147, the signal T goes low and cuts off the analog switch 125. At the same time, the high signal $\overline{T}$ and the high signal $\overline{JGL}$ transmit the signal $\overline{iRON}$ through the gates 172 and 174 to the analog switch 124. The value A+B is now added to the output iNT. The low value JGL causes the counter 165 to count down until the value iNT reaches the value KVC and makes the value COMP go high. The low signal JGL and the high signal COMP, reversed by the inverter 162, turns off the gates 160, 163 and 164 so as to end the counting by the counter 165. The resultant value in the counter 165 represents a distance measurement.

Figure 4:
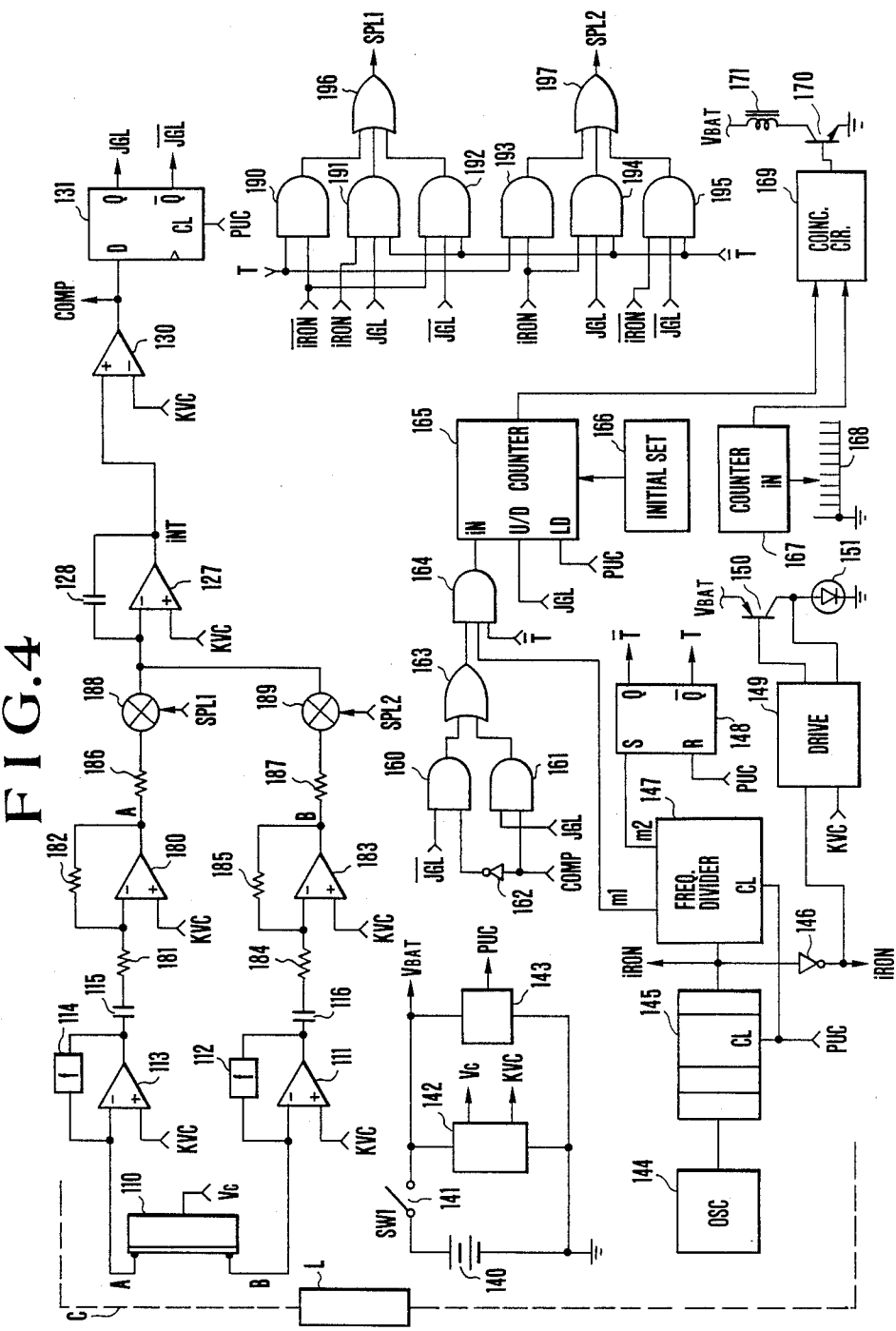
FIG. 4 is a circuit diagram illustrating another embodiment of the invention.

Another embodiment of the invention is shown in FIG. 4. Here, elements having the same reference numerals as shown in FIG. 1 denote like parts. This embodiment differs from that of FIG. 1 in that the latter forms signals A+B and A+B with operational amplifiers 133 and 132, respectively. In the embodiment of FIG. 4, analog switches 188 and 189 switch currents supplied to the Miller integrator 127 and 128, and vary their switching phases so as to constrain the Miller integrator 127, 128 to perform the integration on the basis of the information A−B or A+B.

The components of this embodiment which differ from those of FIG. 1 are as follows. In FIG. 4, an operational amplifier 180 reverses the signal A in conjunction with resistors 181 and 182. An operational amplifier 183 similarly inverts the signal B in conjunction with resistors 184 and 185. Resistors 186 and 187 have the same resistance value for current limiting purposes. Analog switches 188 and 189 respond to signals SPL1 and SPL2. An AND gate 190 receives two inputs, and AND gates 191 and 192 three inputs. The signal T and iRON appear at the AND gate 190. The signal $\overline{T}$, JGL, and iRON appear at the gate 191, while the signals $\overline{T}$, $\overline{JGL}$, and iRON appear at the gate 192. The output of AND gates 190, 191 and 192 pass through a three-input OR gate 196 to form the signal SPL1. The output SPL1 of the OR gate 196 controls the analog switch 188. An AND gate 193 with two inputs receives signals T and iRON. An AND gate 194 with three inputs receives signals $\overline{T}$, JGL, and iRON. An AND gate 195 with three inputs receives signals $\overline{T}$, $\overline{JGL}$, and $\overline{iRON}$. A three-input OR gate 197 passes the outputs of the gates 193, 194 and 195 to the control input of the analog switch 189.

In operation, the signal PUC is generated when the switch SW1 (or 141) closes. This resets the flip-flop 148 and swings the signal T high. AND gates 190 and 193 now open to the signals $\overline{iRON}$ and iRON, which the OR gates 196 and 197 pass to the analog switches 188 and 189, respectively. The operational amplifiers 180 and 183 now generate AC signals corresponding to the output signals A and B of PSD 110. This operation of gates 188 and 189 charges the Miller integration capacitor 128 with a current that corresponds to the signal information A−B.

If A is greater than B, which occurs when the object is close by, the output of the operational amplifier 127 increases and exceeds the reference voltage level KVC after a predetermined time set by the divider 147, the signal $\overline{T}$ swings high, the level of JGL goes high and the level of $\overline{JGL}$ low. Therefore, AND gates 191 and 194 open. The OR gates 196 and 197 now both pass the signal iRON to the analog switches 188 and 189. As a result, the electric charge of the Miller integrator capacitor 128 discharges at a current corresponding to A+B. The level of the output iNT of the amplifier 127 now drops until the comparator 130 reverses the signal COMP and stops the counting by the counter 165.

Where A is smaller than B, i.e. when the object is far away, the level iNT of the operational amplifier 127 drops below the reference level KVC. Hence, even after the signal $\overline{T}$ goes high, the signal JGL remains low and the signal $\overline{JGL}$, high. Therefore, AND gates 192 and 195 open. OR gates 196 and 197 now pass the signal $\overline{iRON}$ to both of the analog switches 188 and 189. This reverses the charge on the capacitor 128 on the basis of the information A+B. As a result, the output iNT of the operational amplifier 127 rises.

The rest of the operation is identical with that of FIG. 1. The operation is also illustrated in FIGS. 3(a) to 3(n).

While a PSD is used as a light receiving photo sensitive element, the invention is not limited to this structure. For example, the invention is also applicable to an auto-focus system in which two photo-sensitive elements are arranged to have the interrelation between their output vary according to the object distance.

Figure 5:
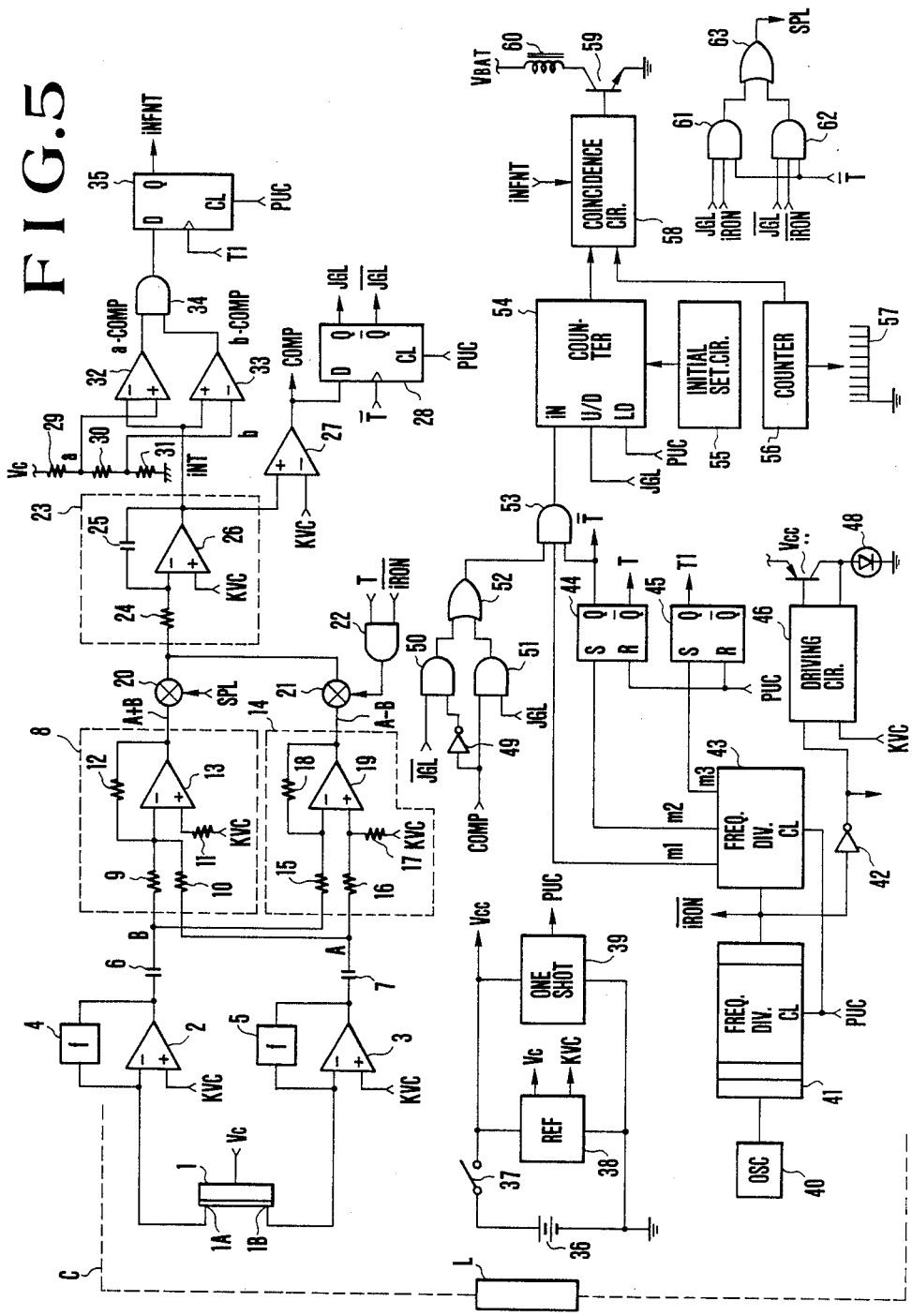
FIG. 5 is a circuit diagram of still another embodiment of the invention.

FIG. 5 illustrates yet another embodiment of the invention and which includes means to indicate, and avoid error, at infinity. In FIG. 5 operational amplifiers 2 and 3 each include inverting input terminals which receive currents generated at the respective electrodes 1A and 1B of the semiconductor position detector 1, and include non-inverting input terminals that each receive a reference voltage KVC. Frequency selection circuits 4 and 5 form high-pass filters in feedback relation with the operational amplifiers 2 and 3, and blocking capacitors 6 and 7 block DC components from the amplifiers 2 and 3. An addition circuit 8 is composed of resistors 9, 10, 11, and 12, and an operational amplifier 13, and a substraction circuit 14 is composed of resistors 15, 16, 17, and 18 and an operational amplifier 19. An analog switch 20 receives a signal SPL (to be described later) at its gate and an analog switch 21 receives a signal at its gate from an AND gate 22. Responding to the output of the analog switches 20 and 22, is a Miller integrating circuit (Miller integrator) 23, which is composed of a resistor 24, a capacitor 25 and an operational amplifier 26. A comparator 27 compares the output iNT of the operational amplifier 26 with a reference level KVC and a D flip-flop 28 produces a signal JGL at its output terminal Q and a signal $\overline{JGL}$ at its output terminal $\overline{Q}$. A determining level a is established at a node between voltage dividing resistors 29 and 30, while a determining level b is established at a node between voltage dividing resistors 30 and 31. These determining levels a and b are set at respective values a little higher and a little lower than the reference level KVC. A comparator 32 compares the output iNT of the Miller integrating circuit 23 with the determining level a, and a comparator 33 compares the output iNT of the Miller integrating circuit 23 with the determining level b. A two-input AND gate 34 receives the outputs a-COMP and b-COMP of these comparators 32 and 33 and applies its output to the D terminal of a D flip-flop 35, which is arranged to supply an infinity signal iNFNT to a coincidence circuit which is to be described.

FIG. 5 further includes a battery 36 that serves as a power supply; a switch 37 which closes when the stroke in the operation of a shutter button reaches a first step or position; a reference voltage generating circuit 38 which generates the reference level voltages Vc and KVC, respectively; and a single pulse generator (one-shot circuit) 39 which produces an initial reset signal PUC. An oscillator or pulse generator 40 generates continuous pulses from which a frequency dividing circuit 41 produces a signal $\overline{iRON}$, which an inverter 42 converts to a signal iRON. A frequency dividing circuit 43 responds to the signal $\overline{iRON}$ at frequency dividing steps m1, m2 and m3. The signal at step m2 sets an RS flip-flop 44, which produces a signal $\overline{T}$ at its output terminal Q and a signal T at its output terminal $\overline{Q}$. Another RS flip-flop 45, set by step m3, is arranged to produce a signal T1 at its output terminal Q after the lapse of a predetermined infinity determining period tc (see FIG. 8). A driving circuit 46 turns an infrared ray emitting diode 48 on and off by on-and-off control of a transistor 47 on the basis of the signal $\overline{iRON}$ received from the inverter 42.

An inverter 49 inverts the output COMP of the comparator 27 and applies it to an input of a two-input AND gate 50. A two-input AND gate 51 receives the value COMP directly. A two-input OR 52 gate applies the output of AND gates 50 and 51 to an input of a three-input AND gate 53. An up-down counter 54 receives a signal from the AND gate 53 at its input terminal iN, the signal JGL at its terminal U/D, and the initial reset signal PUC at its terminal LD. An initial setting circuit 55 generates intitial setting information and supplies it to the up-down counter 54.

A counter circuit 56 counts pulses generated at a comb-shaped electrode 57 as a lens barrel, which is not shown, shifts its position. A coincidence detecting circuit 58 compares the count value of the up-down counter 54 with that of the counter circuit 57 to turn off a switching transistor 59 when the count values of the two coincide. This serves to stop the movement of the lens barrel by cutting off power to an electro magnet 60 which thus performs an automatic focus control operation. A three-input AND gate 61 receives the signals JGL, iRON and $\overline{T}$ and another three-input AND gate 62 receives the signal $\overline{JGL}$, $\overline{iRON}$ and $\overline{T}$. An OR gate 63 supplies the resulting signal SPL to the analog switch 20.

In operation, when the switch 37 is closed at the first step in the stroke of the camera's shutter button, the reference voltage generating circuit 38 generates the reference level voltages Vc and KVC and the one-shot circuit 39 generates the initial reset signal PUC. The signal PUC resets the frequency dividing circuits 41 and 43 and the RS flip-flops 44 and 45. The signal T at the output terminal $\overline{Q}$ of the RS flip-flop 44 then swings high and the signal T1 at the output terminal Q of the RS flip-flop 45 goes low. The D flip-flop 28 now makes the signal JGL go low and the signal $\overline{JGL}$ high. The initial reset signal PUC also sets the up-down counter 54 at an initial value generated by the initial setting circuit 55.

Extinguishing the initial reset signal PUC results in the frequency dividing circuit 41 generating continuous pulse signals $\overline{iRON}$ and in the inverter 42 generating continuous pulses iRON. The driving circuit 46 repeatedly turns the transistor 46 on and off in synchronism with the signal iRON. This causes the infrared ray emitting diode 48 to flicker.

The light projected by the infrared ray emitting diode 48 is reflected by an object to be photographed. The reflected light passes through a light receiving lens, which is not shown, and strikes the semiconductor position detector 1. The interrelation between current produced at two electrodes 1A and 1B of the detector 1 varies with the position at which the reflected light strikes the detector 1. Operational amplifiers 2 and 3, with their high frequency selective feedback circuits 4 and 5, convert the currents produced at these electrodes into voltages in a frequency selective manner. The capacitors 6 and 7 pass only the AC signals at the outputs of the amplifiers 2 and 3.

For the sake of illustration, the output transmitted to the next stage via the capacitor 6 is indicated by a symbol B and the output transmitted via the other capacitor 7, by a symbol A. The substraction circuit 14 obtains a difference between the two outputs A and B and produces a difference signal (A−B) while the addition circuit 8 forms the sum of the output A and B and produces a sum signal (A+B).

Since the RS flip-flop 44 is reset, the signal T is high and the signal $\overline{T}$ low. Hence, the outputs of the AND gates 61 and 62 and that of the OR gate are all low. Therefore, the analog switch 20 remains off. With the signal T high, the AND gate 22 produces the signal $\overline{iRON}$. In synchronism with this signal, the analog switch 21 turns on and off. Accordingly, the Miller integrating circuit 23 integrates the difference signal (A−B) from the substraction circuit 14.

The matter in which the device operates varies with the object distance, i.e., the distance to the object whose distance is being measured. The receiving optical system of the semiconductor position detector 1 is arranged such that the electrode 1A produces a larger current than the other electrode 1B, that is, the level of the output A becomes higher than that of the output B, as the object moves closer. Thus, the output B becomes higher when the object distance increases.

The time graphs of FIGS. 6A to 6H show the value changes of PUC, T, $\overline{T}$, T1, iNT, COMP, JGL, and $\overline{JGL}$, along the same time scales in operation of the device when A is greater than B, that is, when the object is close by. Because the difference signal (A−B) is greater than 0 in this cause, the output iNT of the operational amplifier 26 becomes higher than the reference level KVC (see FIG. E). Upone lapse of a predetermined time from the disappearance of the initial reset signal PUC (see FIG. A), the level of the output of the frequency dividing stage m2 of the frequency dividing circuit 43 changes to high. This sets the RS flip-flop 44. The signal $\overline{T}$ swings high and the signal T changes to low as shown in FIGS. 6B and 6C. Therefore, the output of the AND gate 22 changes to low. The analog switch 21 now turns off to stop the rise of the output iNT.

Since the level of th output iNT of the operational amplifier 26 has become higher than the reference level KVC, the level of the output COMP of the comparator 27 is also high. Therefore, at the time the signal $\overline{T}$ rises to a high, the D flip-flop 28 is triggered to make the signal JGL go high and the signal $\overline{JGL}$ low, as shown in FIGS. 6C, 6G and 6H. The output of the AND gate 62 stays low. However, the output of the AND gate 61 goes high. Therefore, the OR gate 63 produces the signal iRON. The analog switch 20 now turns on and off in synchronism with the signal iRON. This causes the electric change of the Miller integrating capacitor 25 to be discharged by the sum signal (A+B) of the addition circuit 8. As a result, the output iNT of the operational amplifier 26 decreases as shown in FIG. 6E.

Since the signal $\overline{JGL}$ is low at that time, the output of the AND gate 50 is low. However, since the signal JGL and the output COMP of the comparator 27 are high, the output levels of the AND gate 51 and the OR gate 52 are high. Therefore, when the level of the signal $\overline{T}$ becomes high, and the frequency dividing stage m1 of the frequency dividing circuit 43 produces continuous pulses, the up-down counter 54, which has been set into an up counting mode by the high signal JGL, begins to count up.

When the declining level of the output iNT of the operational amplifier 26 drops lower than the level of the reference voltage KVC, the level of the output COMP of the comparator 27 swings low. This causes the output level of the AND gate 51 and that of the OR gate 52 to go low and close the AND gate 53. The up-down counter 54 now stops counting up. At this instant, the result of count at the counter 54 is supplied to the coincidence circuit 58. Following this, a release mechanism, which is not shown, causes the lens barrel to shift from an infinity distance position toward a close-up position. The comb-shaped elecrode 57 produces pulses on the basis of the movement of the lens barrel. The counter circuit 56 counts these pulses. When the count value of the counter circuit 56 coincides with the count value of the up-down counter 54, the output of the coincidence circuit 58 changes. The transistor 59 then turns off the to cut off power supply to the electromagnet 60. With the power supply to the electro magnet 60 cut off, the movement of the lens barrel is brought to a stop by a known mechanism and the focusing operation ends.

An automatic focus control operation begins when the output iNT of the operational amplifier 26 becomes lower than the level of the reference voltage KVC as mentioned above. Hence, the infinity distance determining circuit, composed of the resistor 29 and the D flip-flop 35, of course does not operate even if the output iNT of the operational amplifier 26 is higher than the determining level b (KVC is greater than iNT, and iNT is greater than b) when the level of the signal T1 produced by the RS flip-flop 45 changes to high after the commencement of the automatic focus control operation.

The time charts of FIGS. 7A to 7H show the value changes of PUC, T, $\overline{T}$, T1, iNT, COMP, JGL, and $\overline{JGL}$ along the same time scales during operation when A is less than B, i.e., where the object is located far away from the distance measuring device. In this case, the difference signal (A−B) is less than 0. Therefore, the output iNT of the operational amplifier 26 becomes lower than the level of the reference voltage KVC. At the above stated time when the signals T and $\overline{T}$ at the output terminals Q and $\overline{Q}$ of the RS flip-flop 44 change respectively to high, low as shown in FIGS. 7B, 7C, 7F, the output COMP of the comparator 27 is low. Therefore, the D flip-flop 28 is not triggered. The signal JGL and $\overline{JGL}$, which are produced from the D flip-flop 28, thus remain low and high, respectively, as shown in FIGS. 7G and 7H. Hence, the output of the AND gate 51 remains low. However, since the output of the inverter 49 is high, the output levels of the AND gate 51 and the OR gate 52 are high. Therefore, when the level of the signal $\overline{T}$ changes to high, the continuous pulses of the frequency dividing stage m1 are produced by the AND gate 53.

Upon receiving the continuous pulses, the up-down counter 54 begins to count down, because the low signal JGL places the up-down counter 54 in a down counting mode. With the signal JGL low and the signal $\overline{JGL}$ high, the output of the AND gate 61 remains low when the signal $\overline{T}$ goes high. However, the signal $\overline{iRON}$ is produced by the AND gate 62. The OR gate 63 passes this signal to the analog switch 20.

The analog switch 20 now turns on and supplies the sum signal (A+B) at the output of the addition circuit 8 to the Miller integration circuit 23. This sum signal (A+B) discharges the electric charge of the Miller integrating capacitor 25. The level of the output iNT of the operational amplifier 26 then begins to rise, as shown in FIG. 7E. When the value iNT exceeds the level of the reference voltage KVC, the output COMP of the comparator 27 changes to high. The output level of the inverter 49 now goes low and the output of the AND gate 51 and that of the OR gate 52, therefore, change to low. The AND gate 53 now closes and the up-down counter 54 stops counting down. The count value of the up-down counter at this time represents information concerning the measured distance. The automatic focus control operation is now performed in the manner previously mentioned.

When A=B, i.e., when the object to be photographed is located at a medium distance and its image strikes the mid-portion of the semiconductor position detector 1, the operation of the embodiment then follows the pattern of the time chart of FIG. 8A to 8G, which show the values PUC, T, $\overline{T}$, T1, iNT, a-COMP and b-COMP along the same time scale. Since (A−B)=0 in this instance, the output iNT of the operational amplifier 26 remains almost completely unchanged while the signal T is high. However, the level of the sum signal (A+B) changes. Therefore, the output iNT increases or decreases as shown in FIG. 8E in response to some level change (from the level of the reference voltage KVC) when the level of the signal $\overline{T}$ changes to high. In the event that the output iNT increases somewhat while the signal T is high and decreases when the signal $\overline{T}$ changes to high as shown by a full line in FIGS. 8B, 8C, and 8E, the output iNT becomes lower than the level of the determining voltage b applied to the inverting input terminal of the comparator 33 when the signal $\overline{T}$ is high. Then, the output b-COMP of the comparator 33 changes to low. As a result, the output of the AND gate 34 also changes to a low.

The output of the D flip-flop 35 now remains low even when the level of the signal T1 produced by the RS flip-flop 45 changes to high, as shown in FIG. 8D. The signal T1 goes high after the signal $\overline{T}$ goes high. As a result, the D flip-flop 35 does not produce the infinity signal iNFNT. The predetermined infinity determining period tc is arranged to be longer than a length of time which is required for having the output iNT of the Miller integration circuit 23 brought back to its initial value by the inverse integration of the sum signal (A+B) obtained with the object located at the farthest point within the measurable distance range.

If the output iNT lowers somewhat while the signal T remains high, as indicated by a broken line in FIG. 8E, the sum signal (A+B) caused the output iNT to rise when the signal $\overline{T}$ changes to high. When the level of the output iNT exceedss the determining level a applied to the non-inverting input of the comparator 32, the level of the output a-COMP of the comparator 32 changes to low. Then, the output of the AND gate 34 also becomes low. Therefore, in the same manner described above, the D flip-flop 35 does not produce the infinity signal iNFNT.

In the event A=B, the up-down counter 54 does not perform a counting operation. In this instance, therefore, the count value set by the initial setting circuit 55 represents the measured distance information.

The time charts of FIGS. 9A to 9G illustrate the values PUC, T, $\overline{T}$, T1, iNT, a-COMP, and b-COMP, along the same time scales during the operation of the embodiment when the object to be photographed is located close to infinity. In that instance, both the outputs A and B are close to zero. Therefore, as shown in FIG. 9E, the output iNT of the operational amplifier 26 changes little while the signals T and $\overline{T}$ are high. Then, the outputs a-COMP and b-COMP of the comparators 32 and 33 and the output of the AND gate 34 remain high. Therefore, the D flip-flop 35 is triggered when the signal T1 goes high. The output terminal Q of the D flip-flop 35 produces the infinity signal iNFNT. The infinity signal iNFNT renders the coincidence circuit 58 inoperative. Then, when a release operation is performed, the electro-magnet 60 remains energized and the phot-taking lens (or the lens barrel) is shifted to infinity, i.e., its position for taking a picture at infinity.

In practicing the invention, the determining levels a and b to be used as comparison levels by the comparators 32 and 33 of the embodiment shown in FIG. 5 and the timing for the high level of the signal T1, are suitably set according to the varying level of the output iNT obtained at a distance to be determined as infinity. Also, when A=B, a small variation in the output iNT obtained while the signal T is high causes a rise or fall of the output iNT obtained while the signal $\overline{T}$ is high. Therefore, two comparators 32 and 33 are used to determine infinity. However, the two comparators may be replaced with a single comparator by switching the comparison level from one level to the other on a known time sharing basis. If the output iNT is in a decreasing mode while the signal $\overline{T}$ is high, when A=B, the number of comparators may be reduced to a single comparator with the level of the output iNT arranged to be raised by changing the integrating direction (i.e. by changing the timing for sampling) when the output iNT reaches the level of the reference voltage KVC. This purpose is achieved by the circuitry shown in FIG. 10.

Figure 10:
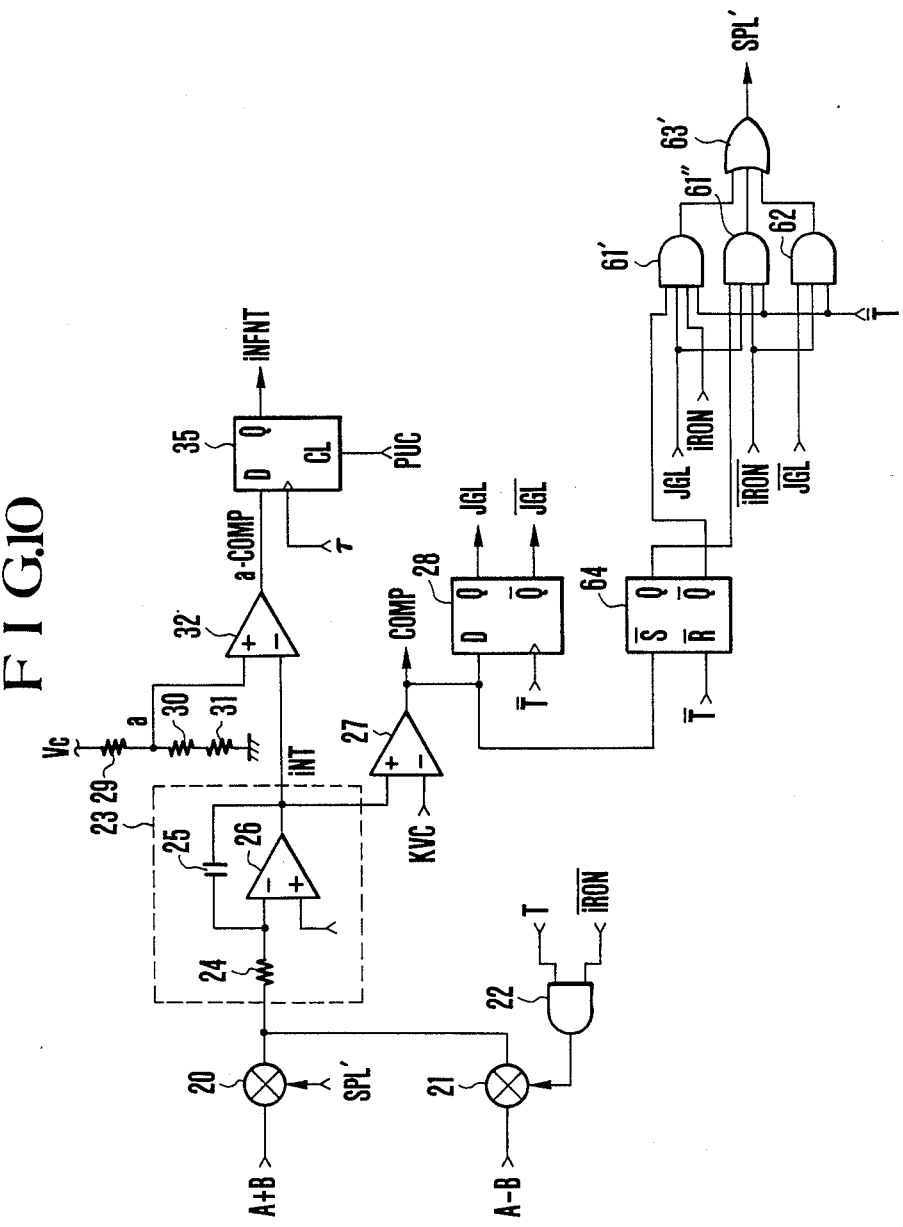
FIG. 10 is a circuit diagram showing a modification of the circuit arrangement of FIG. 5 and embodying the invention.
Figure 11A:
FIGS. 11A to 11D are time charts showing the operation of various circuit elements included in the circuit of FIG. 10.
Figure 11B:
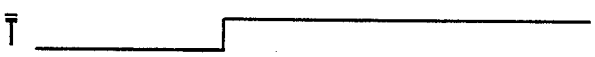
Figure 11C:
Figure 11D:
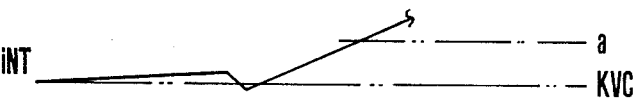

In FIG. 10, an RS flip-flop 64 is reset by the high signal $\overline{T}$ and set by the high output COMP of the comparator 27. The output from the output terminal Q of the RS flip-flop 64 is supplied to an AND gate 61″ and the output from another output terminal $\overline{Q}$ is supplied to another AND gate 61′. An OR gate 63′ produces a signal SPL′. When the signal $\overline{T}$ becomes high, it resets the RS flip-flop 64 and the AND gate 61′ opens. Then, the signal iRON is produced by the OR gate 63′. The level of the output iNT of an operational amplifier 26 gradually decreases. When the level of the output iNT becomes lower than the level of the reference voltage KVC, the level of the output COMP of the comparator 27 changes to low. This sets the RS flip-flop 64 which, this time, opens the AND gate 61″. Now the OR gate 63′produces the signal $\overline{iRON}$. The level of the output iNT rises (see FIGS. 11A to 11D which illustrates the values T, $\overline{T}$, T1, and iNT along the same time scale during operation of this circuit). The circuit thus permits infinity determination by means of only a single comparator 32.

Various circuit arrangements other than the arrangement described may, of course, be conceived for obtaining the difference signal (A−B) and the sum signal (A+B). In addition, an arrangment to display the infinity signal iNFNT concurrently with its generation is also easily evident to one skilled in the art. Further, while the semi-conductor position detector 1 is used in the embodiment shown in FIG. 5, it may be replaced with two photo-sensitive elements.

In the embodiments described, infinity is determined by finding whether or not the level of the output iNT of the Miller integration circuit 23, obtained after the lapse of a predetermined infinity determining period to, is within the range of determining levels a and b, which are set a little higher and a little lower than the reference level KVC. Therefore, an infinite distance can be accurately determined because an object located at a medium distance (in the event A=B) is never erroneously determined to be infinity.

In the examples described, the semiconductor position detector 1 may be described as light receiving means of this invention; the Miller integration circuit 23 as integrating means; the comparator 27, the D flip-flop 28, the inverter 49, the AND gates 50 and 51, the OR gate 52, the AND gate 53, the up-down counter 54 and the initial setting circuit 55, jointly as distance information detecting means; the portion of the circuit arrangement from the resistor 30 to the D flip-flop 35 and the determining levels a and b, as the infinity determining means; the infinite determining period to as the predetermined infinity determining period; and the outputs A and B as the first and second signals. However, the invention is not limited to such interpretation.

The infinity determining means determines infinity by comparing the output level of the integrating means, obtained after the lapse of the infinity determining period, with a determining level which is set on the basis of the initial value of the output level. Therefore, the arrangement according to this invention is capable of always accurately performing the infinity determining operation.

It should be noted that the comb-shaped electrode 57 is mounted on the lens barrel holding the photo-taking or picture-taking lens L. This lens and barrel are the ones which are referred to throughout the specification as being shifted.

Figure 12A:
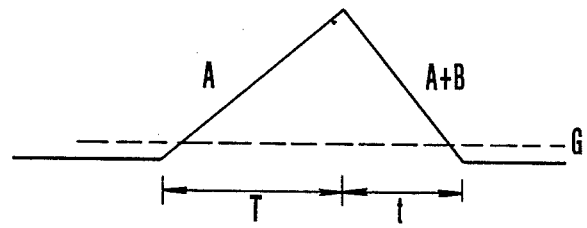
FIGS. 12(a) and 12(b) are illustrations showing output waveforms obtained by a previously proposed infinity determining method.
Figure 12B:
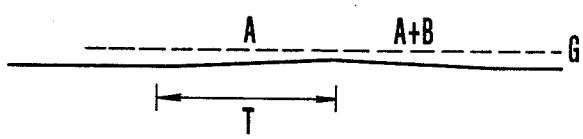
Figure 13:
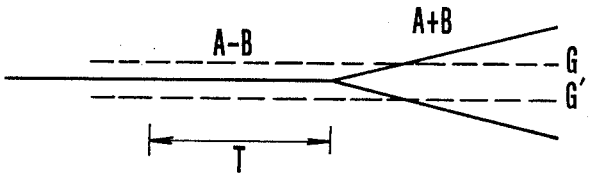
FIG. 13 is a waveform chart showing an output wave form obtained with the infinity determining method of FIGS. 12(a) and 12(b) but carried out using a difference signal integrating operation.

FIGS. 12(a), and 12(b) and 13 disclose the disadvantages of infinity determining arrangements in the aforementioned Japanese Application SHO 58-127409. There, a signal A is generated and the integrated value A+B subtracted therefrom, and the values compared with a reference level G.

Infinity is indicated when the integrated value obtained at the end of the predetermined period T is below a reference level G. In other words, the system discriminates between infinity and a closer distance on the basis of whether the integrated value, obtained at the end of the predetermined period of time, is above or below a reference level G. FIG. 12(a) shows the output of the Miller integration circuit obtained in the event of a distance closer than infinity by the circuit of SHO 58-127409. FIG. 12(b) shows the output when the distance is near infinity. If integration is carried out, according to SHO 58-127409, by means of a difference signal (A−B), the integrated value obtained at the end of the predetermined period of time T becomes almost zero, or A−B=0 in the event A=B (with the object located at a medium distance), as shown in FIG. 13. Therefore, the output of the Miller integration circuit in SHO 58-127409 does not exceed a reference level G (or G'). As a result, the device in the previous application erroneously determines the object distance to be infinity even when A=B.

While the embodiments of the invention have been described in detail, it will be evident that the invention may be embodied otherwise without departing from the spirit and scope of the invention.

I claim:

1. A distance measuring device for measuring a distance to an object in accordance with a position where a signal, projected by the device and reflected by the object, is received, comprising:
    (A) signal projecting means for projecting a signal to the object;
    (b) signal receiving means for receiving the signal reflected from the object and producing two outputs which vary with the position where the reflected signal is received thereon;
    (c) first integrating means for integrating one of the difference between the two outputs of the signal receiving means and the amount corresponding to the difference, and second integrating means for integrating one of the sum of the two outputs and the amount corresponding to the sum; and
    (D) computing means for computing the ratio of an integration time required by said first integrating means when integrating one of the difference between the two outputs of the signal receiving means and the amount corresponding to the difference, to an integration time required by said second integrating means when integrating one of the sum of the two outputs and the amount corresponding to the sum over the same integration amount, and for detecting the position where the reflected signal is received by the signal receiving means on the basis of the ratio.

2. A device as in claim 1, wherein said first integrating means integrates from a given level, in one direction, to an attained level, and said second integrating means integrates in the reverse direction over the same integation amount.

3. A device as in claim 1, wherein said computing means includes timer means for determining the time for the second integrating means to integrate over the same amount.

4. A device as in claim 2, wherein said computing means includes timer means for determining the time for the second integrating means to integrate over the same amount.

5. A device as in claim 1, wherein said computing means includes infinity determining means for determining an infinity distance on the basis of a value of the integration by the second integrating means at a predetermined time relative to a value of the integration by the first integrating means.

6. A device as in claim 5, wherein said computing means includes timer means for determining the time for the second integrating means to integrate over the same amount.

7. A device as in claim 6, wherein said first integrating means integrates from a given level in one direction to an attained level, and said second integrating means integrates in the reverse direction over the same integration amount.

8. A device as in claim 5, wherein said first integrating means starts integrating at a given level; and said infinity determining means includes source means for establishing a first level higher than a given level, and a second level lower than the given level, and sensing means for determining whether the level of an output of the second integrating means, at a predetermined interval after the start of integration, falls between the first level and the second level.

9. A device as in claim 8, wherein said computing means includes timer means for determining the time for the second integrating means to integrate over the same amount.

10. A device as in claim 5, wherein said infinity determining means includes timing means for starting the predetermined period after the end of the integration by said first integrating means.

11. A device as in claim 10, wherein said computing means includes timer means for determining the time for the second integrating means to integrate over the same amount.

12. A device as in claim 8, wherein said source means includes a voltage divider for establishing the first level and the second level; and said sensing means includes a pair of comparators each responsive to respective levels of said voltage divider and to said overall integrated value, gate means responsive to each said comparators, and circuit means responsive to the predetermined interval in said gate means.

13. A distance measuring device for measuring the distance to an object in accordance with a position where a signal, projected by the device and reflected by the object, is received, comprising:
   (A) signal projecting means for projecting a signal to the object;
   (B) signal rceiving means for receiving the signal reflected from the object and producing two outputs which vary with the position where the reflected signal is received thereon;
   (C) computing means for computing the ratio of one of the difference between the two outputs of the signal receiving means and the amount corresponding to the difference to one of the sum of the two outputs and the amount corresponding to the sum, and for detecting the position where the reflected signal is received by the signal receiving means on the basis of the ratio; and
   (D) infinity determining means for determining that the distance to the object is infinite when an integrated value of one of the sum of the two outputs of the signal receiving means, and the amount corresponding to the sum for a predetermined period of time, is less than a given level.

14. A focusing device for a lens, comprising:
   (A) signal projecting means for projecting a signal to an object;
   (B) signal receiving means for receiving the signal reflected from the object and producing two outputs which vary with the position where the reflected signal is received thereon;
   (C) first integrating means for integrating one of the difference between the two outputs of the signal receiving means and the amount corresponding to the difference, and second integrating means for integrating one of the sum of the two outputs and the amount corresponding to the sum;
   (D) computing means for computing the ratio of the integration time required by said first integrating means when integrating one of the difference between the two outputs of the signal receiving means and the amount corresponding to the difference, to the integration time required by said second integrating means when integrating one of the sum of the two outputs and the amount corresponding to the sum over the same integration amount, and for detecting the position where the reflected signal is received by the signal receiving means on the basis of the ratio; and
   (E) a focusing circuit responsive to said computing means for controlling the lens.

15. A device as in claim 14, wherein said first integrating means integrates from a given level in one direction to an attained level, and said second integrating means integrates in the reverse direction over the same integration amount.

16. A device as in claim 14, wherein said computing means includes timer means for determining the time for the second integrating means to integrate over the same amount.

17. A device as in claim 15, wherein said computing means includes timer means for determining the time for the second integrating means to integrate over the same amount.

18. A device as in claim 14, wherein said computing means includes infinity determining means for determining the distance infinity on the basis of a value of an output of the second integrating means of predetermined time relative to a value of an output of the first integrating means.

19. A device as in lciam 18, wherein said computing means includes timer means for determining the time for the second integrating means to integrate over the same amount.

20. A device as in claim 19, wherein said first integrating means integrates from a given level in one direction to an attained level, and said second integrating means integrates in the reverse direction over the same integration amount.

21. A device as in claim 18, wherein said first integrating means starts integrating at a given level, and said infinity determining means includes source means, for establishing a first level higher than the given level and a second level, lower than the given level and sensing means for determining whether the level of the second integrating means output, at a predetermined interval after the start of integration, falls between the first level and the second level.

22. A device as in claim 21, wherein said computing means includes timer means for determining the time for the second integrating means to integrate over the same amount.

23. A device as in claim 19, wherein said infinity determining means includes timing means for starting the predetermined period after the end fo the integration by said first integrating means.

24. A device as in claim 23, wherein said infinity means includes timer means for determining the time for the second integrating means to integrate over the same amount.

25. A device as in claim 21, wherein said source means includes a voltage divider for establishing the first level and the second level; and said sensing means includes a pair of comparators each responsive to respective levels of said voltage divider and to said overall integrated value, gate means responsive to each said comparators, and circuit means responsive to each said comparators, and circuit means responsive to the predetermined interval in said gate means.

26. A focusing device for a lens, comprising:
   signal projecting means for projecting a signal to an object;
   signal receiving means for receiving the signal reflected from the object and producing two outputs which vary with a position where the reflected signal is received thereon;

computing means for computing a ratio of one of the difference between the two outputs of the signal receiving means and the amount corresponding to the difference to one of the sum of the two outputs and the amount corresponding to the sum, and for detecting the position where the reflected signal is received by the signal receiving means on the basis of the ratio;

infinity determining means for determining that a distance to the object is infinite when an integrated value of one of the sum of the two outputs of the signal receiving means and the amount corresponding to the sum for a predetermined period of time, is less than a given level; and circuit means for producing focusing signals for the lens.

27. A camera, comprising:

a body for receiving a lens;

signal projecting means for projecting a signal to an object;

signal receiving means for receiving the signal reflected from the object and producing two outputs which vary with a position where the reflected signal is received thereon;

first integrating means for integrating one of the difference between the two outputs of the signal receiving means and the amount corresponding to the difference, and second integrating means for integrating one of the sum of the two outputs and the amount corresponding to the sum;

computing means for computing a ratio of an integration time required by said first integrating means when integrating one of the difference between the two outputs of the signal receiving means and the amount corresponding to the difference, to an integration time required by said second integrating means when integrating one of the sum of the two outputs and the amount corresponding to the sum over the same integration amount, and for detecting the position where the reflected signal is received by the signal receiving means on the basis of the ratio; and a focusing circuit responsive to said computing means for controlling the lens.

28. A camera as in claim 27, wherein said first integrating means integrates from a given level in one direction to an attained level, and said second integrating means integrates in the reverse direction over the same integation amount.

29. A camera as in claim 27, wherein said computing means includes timer means for determining the time for the second integrating means to integrate over the same amount.

30. A camera as in claim 28, wherein said computing means includes timer means for determining the time for the second integrating means to integrate over the same amount.

31. A camera as in claim 27, wherein said computing means includes infinity determining means for determining the distance infinity on the basis of a value of an output of the second integrating means at predetermined time, relative to a value of an output of the first integrating means.

32. A camera as in claim 31, wherein said computing means includes timer means for determining the time for the second integrating means to integrate over the same amount.

33. A camera as in claim 32, wherein said first integrating means integrates from a given level in one direction to an attained level, and said second integrating means integrates in the reverse direction over the same integration amount.

34. A camera as in claim 31, wherein said first integrating means starts integrating at a given level, and said infinity determining means includes source means for establishing a first level higher than the given level and a second level lower than the given level and sensing means for determining whether the level of the second integrating means output, at a predetermined interval after the start of integration, falls between the first level and the second level.

35. A camera as in claim 34, wherein said computing means includes timer means for determining the time for the second integrating means to integrate over the same amount.

36. A camera as in claim 32, wherein said infinity determining means includes timing means for starting the predetermined period after the end of the integration by said first integrating means.

37. A camera as in claim 36, wherein said computing means includes timer means for determining the time for the second integrating means to integrate over the same amount.

38. A camera as in claim 34, wherein said source means includes a voltage divider for establishing the first level and the second level; and said sensing meand includes a pair of comparators each responsive to respective levels of said voltage divider and to said overall integrated value, gate means responsive to each said comparators, and circuit means respsonsive to each said comparators, and circuit means responsive to the predetermined interval in said gate means.

39. A camera, comprising:

a body for receiving a lens;

signal projecting means for projecting a signal to an object;

signal receiving means for receiving the signal reflected from the object and producing two outputs which vary with a position where the reflected signal is received thereon;

computing means for computing a ratio of one of a difference between the two outputs of the signal receiving means and the amount corresponding to the difference to one of a sum of the two outputs and the amount corresponding to the sum, and for detecting the position where the reflected signal is received by the signal receiving means on the basis of the ratio;

infinity determining means for determining that a distance to the object is infinite when an integrated value of one of the sum of the two outputs of the signal receiving means and the amount corresponding to the sum for a predetermined period of time is less than a given level; and circuit means for producing focusing signals for the lens.

40. A distance measuring device for measuring a distance to an object in accordance with a position at which a signal, projected by the device and reflected by the object, is received, comprising:

(A) signal projecting means for projecting a signal to the object;

(B) signal receiving means for receiving the signal reflected from the object and producing two outputs having a ratio which varies with the position at which the reflected signal is received thereon;

(C) computing means for computing an amount corresponding to an integration of a difference between said two outputs of the signal receiving means, and for computing an amount corresponding to an integration of a sum of said two outputs, said computing means performing the integration opertion for the amount corresponding to the integration of the difference between the two outputs for a determined time; and (D) time counting means for counting an integration time required by said computing means to compute the amount corresponding to the integration of the sum of the two outputs until the amount reaches a predetermined relation with the amount corresponding to the integration of the difference of the two outputs obtained by the integration operation for the predetermined time, wherein the position at which the reflected signal is received by the signal receiving means is detected on the basis of the time counted by said time counting means.

41. A device according to claim 40, wherein said time counting means is arranged to count the integration time required for the computing means to obtain an amount corresponding to the integration of the sum of the two outputs equal to the amount corresponding to the integration of the difference between the two outputs obtained by the integration operation of the predetermined time.

42. A device according to claim 40, wherein said computing menas is arranged to perform the integration operation so as to offset between the amount corresponding to the integration of the difference between the two outputs and the amount corresponding to the integration of the sum of the two outputs.

43. A device according to claim 42, wherein said time counting means is arranged to count the integration time required for the computing means to obtain an amount corresponding to the integration of the sum of the two outputs equal to the amount corresponding to the integration of the difference between the two outputs obtained by the integration operation of the predetermined time.

44. A device according to claim 40, wherein said computing means includes judging means for judging whether the amount corresponding to the integration of the difference is on the plus side or on the minus side.

45. A device according to claim 44, wherein said computing means includes control means for performing the integration operation so as to offset between the amount corresponding to the integration of the difference and the amount corresponding to the integration of the sum on the basis of the judgement by said judging means.

46. A device according to claim 40, further comprising detection means for detecting that the object is at a distance of infinity, or a distance equivalent to infinity, on the basis of the amount corresponding to the integration of the sum of the two outputs obtained by the integration operation for the predetermined time for judging the infinity of the object.

47. A device according to claim 40, further comprising:

focal adjustment means for performing a focal adjustment of a photographic optical system in response to an output of the time counting means.

48. A camera having a distance measuring device for measuring a distance to an object in accordance with a position at which a signal, projected by the device and reflected by the object, is received, comprising:

(A) signal projecting means for projecting a signal to the object;

(B) signal receiving means for receiving the signal reflected from the object and producing two outputs having a ratio which varies with the position at which the reflected signal is received thereon;

(C) computing means for computing an amount corresponding to an integration of a difference between said two outputs of the signal receiving means, and for computing an amount corresponding to an integration of a sum of said two outputs, said computing means performing the integration operation for the amount corresponding to the integration of the difference between the two outputs for a determined time;

(D) time counting means for counting an integration time required by said computation means to compute the amount corresponding to the integration of the sum of the two outputs until the amount reaches a predetermined reltion with the amount corresponding to the integration of the difference of the two outputs obtained by the integration operation for the predetermined time; and (E) focal adjustment means for performing a focal adjustment of a photographic optical system in response to an output of the time counting means.

49. A device according to claim 48, wherein said time counting means is arranged to count the integration time required for the computing means to obtain an amount corresponding to the integration of the sum of the two outputs equal to the amount corresponding to the integration of the difference between the two outputs obtained by the integration operation of the predetermined time.

50. A device according to claim 48, wherein said computing means is arranged to perform the integration operation so as to offset between the amount corresponding to the integration of the difference between the two outputs and the amount corresponding to the integration of the sum of the two outputs.

51. A device according to claim 48, wherein said time counting means is arranged to count the integration time required for the computing means to obtain an amount corresponding to the integration of the sum of the two outputs equal to the amount corresponding to the integration of the difference between the two outputs obtained by the integration operation of the predetermined time.

52. A device according to claim 48, wherein said computing means includes judging means for judging whether the amount corresponding to the integration of the difference is on the plus side or on the minus side.

53. A device according to claim 48, wherein said computing means includes control means for performing the integration operation so as to offset between the amount corresponding to the integration of the difference and the amount corresponding to the integration of the sum on the basis of the judgement by said judging means.

54. A device according to claim 48, further comprising detection means for detecting that the object is at a distance of infinity, or a distance equivalent to infinity, on the basis of the amount corresponding to the integration of the sum of the two outputs obtained by the integration operation for the predetermined time for judging the infinity of the object.

55. A distance measuring device for meansuring a distance to an object in accordance with a position at which a signal, projected by the device and reflected by the object, is received, comprising:
 (A) signal projecting means for projecting means for projecting a signal to the object;
 (B) signal receiving means for receiving the signal reflected from the object and producing two outputs which vary with the position where the reflected signal is received thereon;
 (C) computing means for computing the ratio of one of the difference between the two outputs of the signal receiving means and the amount corresponding to the difference to one of the sum of the two outputs and the amount corresponding to the sum, and for detecting the position where the reflected signal is received by the signal receiving means on the basis of the ratio; and
 (D) judging means for judging that the object is at a distance of infinity, or a distance equivalent to infinity, on the basis of an integrated vlaue of one of the sum of the two outputs of the signal receiving means and the amount corresponding to the sum for a predetermined period of time.

56. A camera having a distance measuring device for measuring a distance of an object in accordance with a position at which a signal, projected by the device and reflected by the object, is received comprising:
 (A) signal projecting means for projecting means for projecting a signal to the object;
 (B) signal receiving means for receiving the signal reflected from the object and producing two outputs which vary with the position where the reflected signal is received thereon;
 (C) computing means for computing the ratio of one of the difference between the two outputs of the signal receiving means and the amount corresponding to the difference to one of the sum of the two outputs and the amount corresponding to the sum, and for detecting the position where the reflected signal is received by the signal receiving means on the basis of the ratio;
 (D) judging means for judging that the object is at a distance of infinity, or a distance equivalent to infinity, on the basis of an integrated value of one of the sum of the two outputs of the signal receiving means and the amount corresponding to the sum for a predetermined period of time; and
 (E) focal adjustment means for performing a focal adjustment of a photographic optical system in response to an output of either the computing means or the judging means.

* * * * *